United States Patent
Takahashi

(10) Patent No.: US 7,420,779 B2
(45) Date of Patent: Sep. 2, 2008

(54) DISK APPARATUS HAVING SUSPENSION PROVIDED WITH HEAD SUPPORT PROJECTIONS

(75) Inventor: Shinichi Takahashi, Kawasaki (JP)

(73) Assignee: Fujistu Limited, Kawasaki (JP)

(*) Notice: Subject to any disclaimer, the term of this patent is extended or adjusted under 35 U.S.C. 154(b) by 359 days.

(21) Appl. No.: 10/984,105

(22) Filed: Nov. 9, 2004

(65) Prior Publication Data

US 2005/0275972 A1  Dec. 15, 2005

(30) Foreign Application Priority Data

Jun. 9, 2004  (JP)  ............................. 2004-171145

(51) Int. Cl.
*G11B 5/49* (2006.01)
(52) U.S. Cl. .................................. 360/245.1
(58) Field of Classification Search ............... 360/245.1
See application file for complete search history.

(56) References Cited

U.S. PATENT DOCUMENTS 5,027,241 A * 6/1991 Hatch et al. ................. 360/255
5,291,359 A * 3/1994 Wolter ...................... 360/254.7
5,473,488 A * 12/1995 Gustafson et al. ......... 360/245.5
5,636,089 A * 6/1997 Jurgenson et al. ......... 360/245.1
5,652,684 A * 7/1997 Harrison et al. ........... 360/245.1
5,666,241 A * 9/1997 Summers .................. 360/245.1
5,682,669 A * 11/1997 Harrison et al. ........... 29/603.06
5,852,532 A * 12/1998 Summers .................. 360/245.1

FOREIGN PATENT DOCUMENTS

JP  11-250429  9/1999

* cited by examiner

*Primary Examiner*—Tianjie Chen
(74) *Attorney, Agent, or Firm*—Greer, Burns & Crain, Ltd.

(57) ABSTRACT

A disk apparatus, e.g., a magnetic disk apparatus has a storage medium in the form of a disk which is rotated and accessed, and is designed so as to reduce the occurrence of scratches on the storage medium due to contact between the head and the storage medium while ensuring stable access to the disk-type storage medium. In addition to a main dowel which is provided on a suspension and which supports a magnetic head at a center of the same, an auxiliary dowel is provided on the suspension on the air outflow side relative to the main dowel to limit the tilt of the magnetic head at the time of loading.

5 Claims, 6 Drawing Sheets

DISK APPARATUS HAVING SUSPENSION PROVIDED WITH HEAD SUPPORT PROJECTIONS

BACKGROUND OF THE INVENTION

1. Field of the Invention

The present invention relates to a disk apparatus, for example, a magnetic disk apparatus in which a storage medium in the form of a disk is rotated and is accessed.

2. Description of the Related Art

Magnetic disk apparatus have found great use as apparatus incorporated in or externally connected to computers. In recent years, magnetic disk apparatus have been incorporated not only in computers in a narrow sense but also in video devices, digital cameras, vehicle navigation devices, etc.

Magnetic disk apparatus are broadly divided into two types: one called a contact stop/start (CSS) type and one called a load/unload type. In CSS-type magnetic disk apparatus, a magnetic head slider on which a magnetic head for accessing a magnetic disk is fixed (the magnetic head and the magnetic head slider hereinafter referred to, for ease of description, as a magnetic head without being discriminated from each other) is left in a state of being placed on the magnetic disk. When the magnetic disk in a CSS-type magnetic disk apparatus is rotated, the magnetic head is floated by an air flow accompanying the rotation to be is slightly spaced apart from the magnetic disk surface. In this state, the magnetic disk is accessed with the magnetic head.

In load/unload-type magnetic disk apparatus, the magnetic head is moved to a position off the outer circumference of the magnetic disk and maintained in a standby state at this position when the magnetic disk stops rotating (which moving is called unloading), and is moved onto the magnetic disk after the magnetic disk has started rotating (which moving is called loading).

The conventional dominating magnetic disk apparatus have been CSS-type magnetic disk apparatus. However, with the increase in the recording density of magnetic disks in recent years, the surface roughness of magnetic disks has become lower to increase the risk of sticking (stiction) fault such that once the magnetic head is brought into contact with the magnetic disk surface, it sticks to the magnetic disk surface.

With a CSS-type magnetic disk apparatus incorporated in a portable appliance such as a notebook computer, there is a problem that high shock resistance is required of the CSS-type device since the portable appliance is frequently carried, and it is disadvantageous to use the CSS-type device under such a condition since the magnetic head contacts the magnetic disk.

Because of these problems, load/unload-type magnetic disk apparatus have been widely adopted in recent years. Load/unload-type magnetic disk apparatus can have higher shock resistance in comparison with CSS-type devices because the magnetic head is in the standby position off the magnetic disk when the magnetic disk apparatus is not operating.

In the case of load/unload-type magnetic disk apparatus, however, a transient operation to load the magnetic head onto the rotating magnetic disk is involved and there is a problem that the magnetic head is liable to contact and damage the magnetic disk during the transient operation.

The magnetic head is constructed so that a surface of the magnetic head opposite from the floating surface on the magnetic disk side is supported on a projection and the magnetic head is tilted on the projection. Japanese Patent Laid-Open No. 11-250429 discloses a technique of forming this projection at a position offset from a center of the magnetic head on the air flow downstream side. If the projection is formed at such a position, the floating surface of the magnetic head can face easily in a direction on the air flow upstream side to obtain a sufficiently large lifting force. Contact between the magnetic head and the magnetic disk is thereby avoided to reduce the occurrence of scratches on the magnetic disk.

The technique disclosed in Japanese Patent Laid-Open No. 11-250429 as a technique for obtaining a sufficiently large lifting force by supporting the magnetic head on a projection formed at a position offset from the center of the magnetic head on the air flow downstream side entails a problem that the attitude of the magnetic head is unstable since the projection supporting the magnetic head is set at a position offset from the center of the magnetic head. For example, the magnetic head is floated on the air flow upstream side to excessively tilt the magnetic head. Thus, there is a possibility of a considerable reduction in the stability with which the magnetic disk is accessed with the magnetic head.

SUMMARY OF THE INVENTION

The present invention has been made in view of the above circumstances and provides a disk apparatus capable of reducing the occurrence of scratches on a disk-type storage medium due to contact between the head and the storage medium while ensuring stable access to the storage medium.

A disk apparatus in accordance with the present invention, in which a storage medium in the form of a disk is rotated and accessed, has: a head which is brought close to the storage medium, and with which the storage medium is accessed; an arm which is rotated to move its tip end portion in a radial direction of the storage medium; a suspension which is provided on the tip end portion of the arm, and which has a first projection; and a gimbal which is attached to the suspension, and through which the head is supported on the first projection at a center of the head, the head being fixed on the gimbal so as to be tiltable on the first projection, wherein the suspension has a second projection at a position adjacent to the first projection and superposed on the head as seen in a direction perpendicular the head.

Preferably, in the disk apparatus of the present invention, the second projection of the suspension is provided on the air outflow side relative to the first projection.

Preferably, the second projection is lower in height than the first projection.

Preferably, in the disk apparatus of the present invention, the second projection has a height such that the tilt of the head on the air inflow side in a state where the head is supported on both the first projection and the second projection is equal to or larger than minus one degree.

Preferably, in the disk apparatus of the present invention, the arm rotates to move the tip end portion of the arm beyond the outer circumference of the storage medium, the disk apparatus further has a supporting member which supports the arm in a state of having the tip end portion of the arm moved to a position off the storage medium.

In the disk apparatus of the present invention, the above-described second projection is provided in addition to the first projection corresponding to that provided in the conventional arrangement, thereby maintaining the head in such an attitude that a sufficient lifting force can be obtained, stabilizing the attitude of the head to ensure stable access to the storage medium even when the head is in a state of floating above the storage medium. The disk apparatus of the present invention

DETAILED DESCRIPTION OF THE INVENTION

A preferred embodiment of the present invention will be described.

Figure 1:
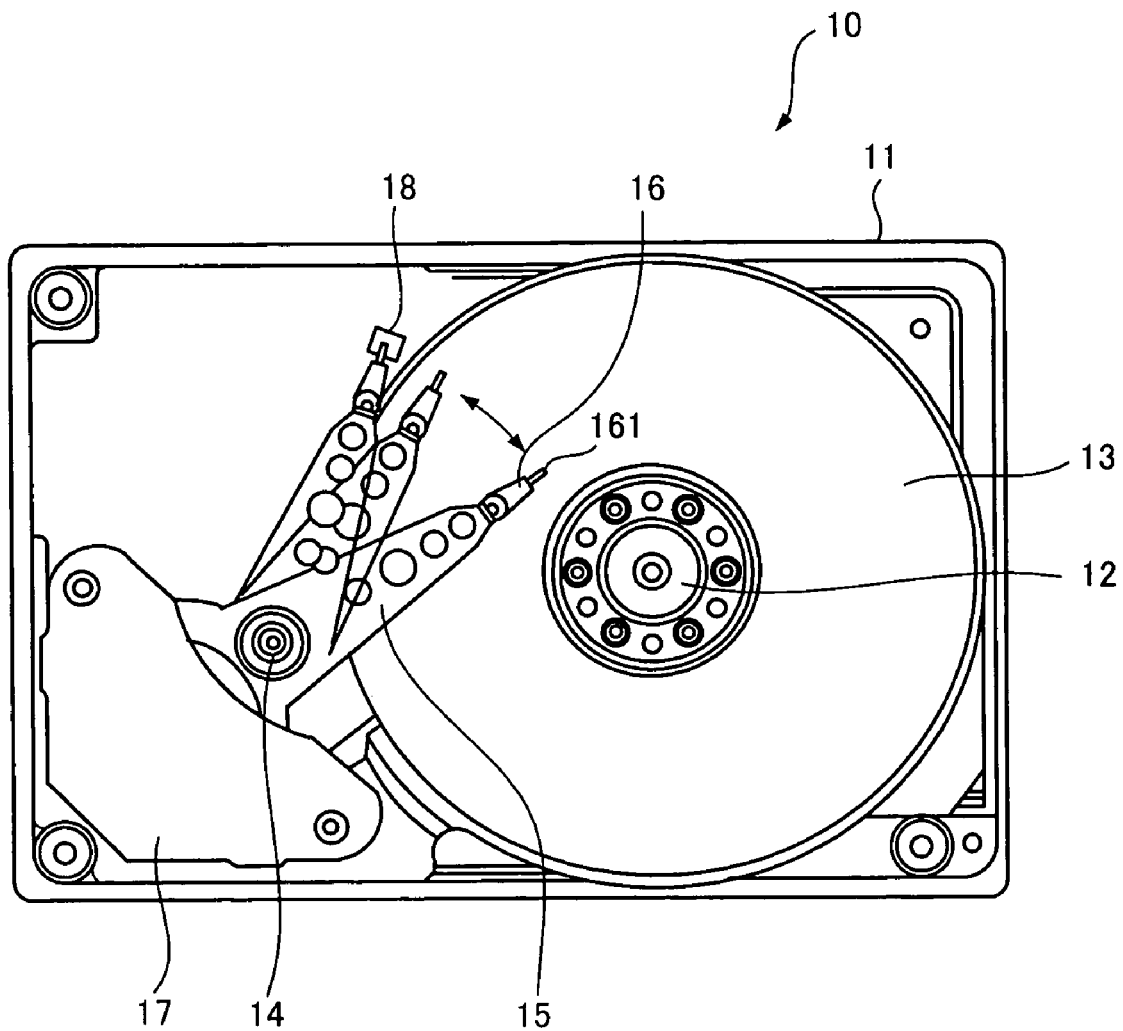
FIG. 1 is a diagram schematically showing a magnetic disk apparatus which is an embodiment of the present invention.

FIG. 1 is a diagram schematically showing a magnetic disk apparatus which is an embodiment of the present invention.

In a housing 11 of the magnetic disk apparatus 10 are accommodated a rotating shaft 12, a magnetic disk 13 attached to the rotating shaft 12, a swing shaft 14, a carriage arm 15 which can swing on the swing shaft 14, a head assembly 16 provided on a carriage arm tip portion, an actuator 17 which drives the carriage arm 15 to cause to swing, and a ramp 18 which is provided in a position off the outer circumference of the magnetic disk 13, and which supports a projection 161 constituting the head assembly 16 provided at the carriage arm 15 tip when the carriage arm 15 is swung to the position of the ramp 18 so that the projection 161 runs onto the ramp 18. When an access (read/write) to the magnetic disk 13 is made, the carriage arm 15 is driven and swung by the actuator 17 constituted by a magnetic circuit to position a magnetic head (not shown) provided in the head assembly 16 on a desired one of tracks on the rotating magnetic disk 13. The magnetic disk 13 is then accessed with the magnetic head. The internal space of the housing 11 is closed with a cover (not shown).

The structure of the head assembly 16 provided on the tip portion of the carriage arm 15 will be described below. Description will first be made of the structure of a conventional head assembly before the description of the structure of the head assembly in this embodiment.

Figure 2:
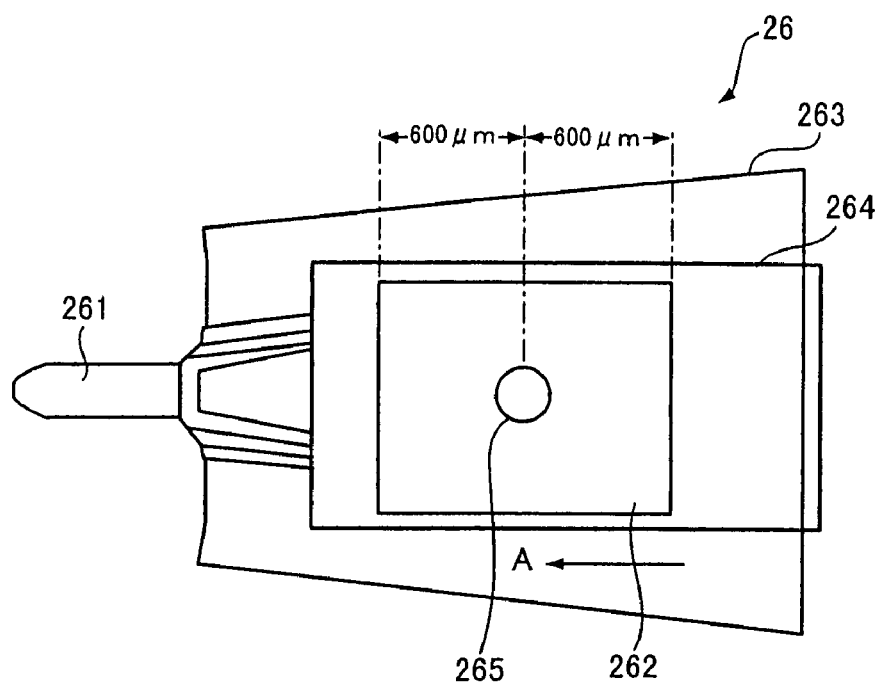
FIG. 2 is a see-through top view of a conventional head assembly seen from the floating surface side of a magnetic head.
Figure 3:
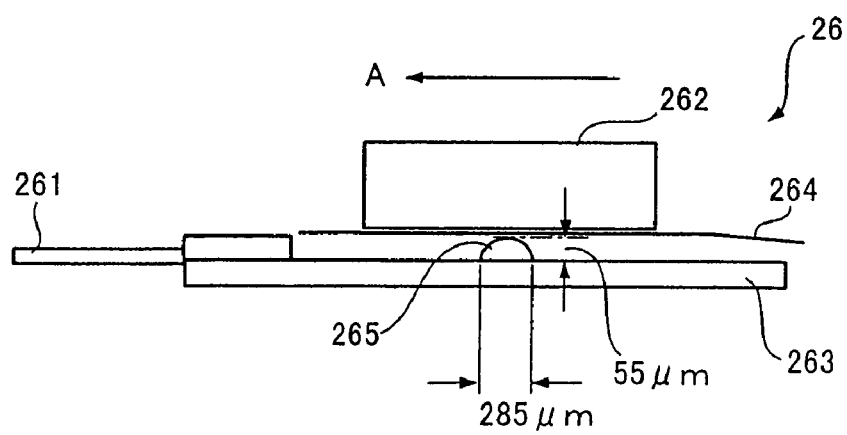
FIG. 3 is a side view of the conventional head assembly shown in FIG. 2, with the floating surface of the magnetic head shown at the top.

FIG. 2 is a see-through top view of a conventional head assembly seen from the floating surface side of a magnetic head. FIG. 3 is a side view of the conventional head assembly shown in FIG. 2, with the floating surface of the magnetic head shown at the top. A combination of a magnetic head in a narrow sense (a portion through which read/write is actually performed) and a head slider on which the magnetic head is fixed is referred to as a magnetic head in this specification, as mentioned above.

The head assembly 26 shown in FIGS. 2 and 3 has a projection 261, a magnetic head 262 (including a slider) a suspension 263 and a gimbal 264.

Arrow A shown in FIGS. 2 and 3 indicates the direction of an air flow caused by the rotation of the magnetic disk 13 (see FIG. 1).

The projection 261 is fixed on the suspension 263 so as to project from an extreme tip of the suspension 263. A dowel (projection) 265 is provided on the suspension 263. The dowel 265 supports the magnetic head 262 by point-to-point contact therebetween, with the gimbal 264 interposed between the dowel 265 and the magnetic head 262. The dowel 265 is a semispherical projection having a diameter of 285 μm and a height of 55 μm, as shown in FIG. 3. The dowel 265 is formed at such a position as to support the magnetic head 262 having a length of 1200 μm at a center of the same, as shown in FIG. 2. The suspension 263 is fixed to a tip portion of the carriage arm 15 shown in FIG. 1.

The magnetic head 262 is fixed on the gimbal 264. The gimbal 264 is attached to the suspension 263. The magnetic head 262 is provided in such a structure that the magnetic head 262 is fixed to the gimbal 264, is supported by the dowel 265 with the gimbal 264 interposed between the magnetic head 262 and the dowel 265, and is tiltable according to factors including the air flow on one central point at which it is supported on the dowel 264.

Figure 4:
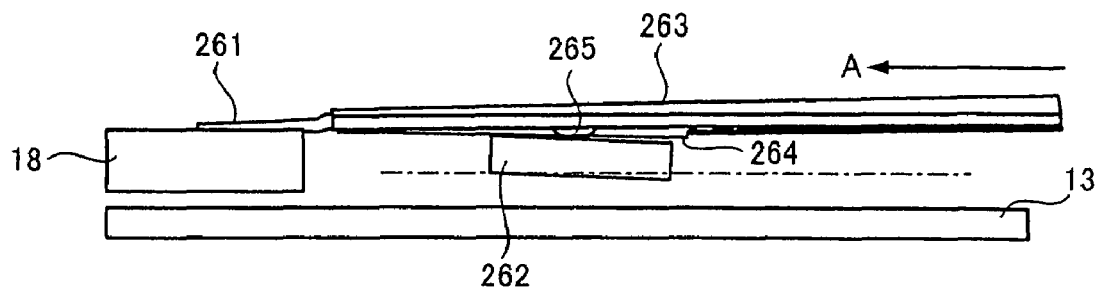
FIG. 4 is a diagram showing the attitude of the magnetic head.
Figure 5:
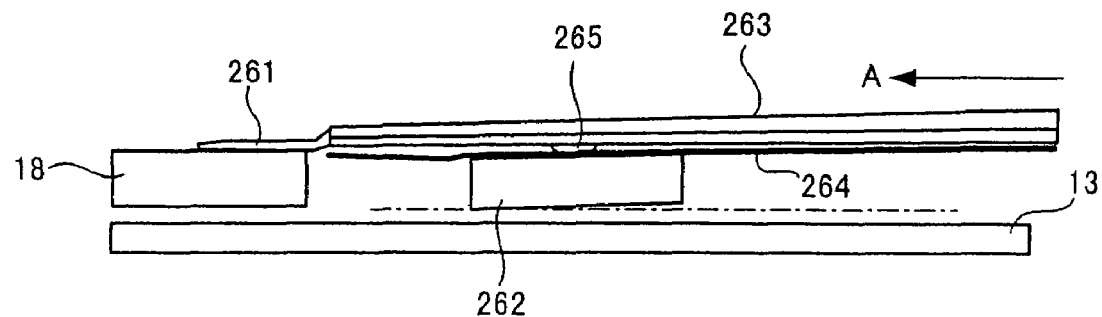
FIG. 5 is a diagram showing the attitude of the magnetic head.

FIGS. 4 and 5 are diagrams showing the attitude of the magnetic head.

FIG. 4 shows a state in which the tilt of the magnetic head 262 on the air inflow side (a side as seen from the center of the magnetic head 262 in a direction opposite to the direction of arrow A) when the projection 261 is on the ramp 18 (in a static state) is minus (a state in which the air flow-in side of the magnetic head 262 is lowered with respect to a horizontal line (the dot-dash line indicated in FIG. 4)). FIG. 5 shows a state in which the tilt of the magnetic head 262 on the air inflow side (a side as seen from the center of the magnetic head 262 in a direction opposite to the direction of arrow A) when the projection 261 is on the ramp 18 (in a static state) is plus (a state in which the air inflow side of the magnetic head 262 is heightened with respect to the horizontal line (the dot-dash line indicated in FIG. 4)). The state shown in FIG. 4 is expressed as "the static pitch is minus", and the state shown in FIG. 5 is expressed as "the static pitch is plus". When the static pitch is minus as shown in FIG. 4, the lifting force produced by the air flow accompanying the rotation of the magnetic disk 13 is small. If the minus value of the static pitch is large, there is a risk of the magnetic head 262 contacting the magnetic disk 13 to scratch the magnetic disk 13 during the loading operation.

On the other hand, when the static pitch is plus as shown in FIG. 5, the lifting force produced by the air flow accompanying the rotation of the magnetic disk 13 is increased to tilt the magnetic head 262 so that the risk of contact of the magnetic head 262 with the magnetic disk 13 is low.

In the conventional arrangement, the static pitch cannot be controlled so as to be constant and the static pitch varies among magnetic disk apparatus. In a case where the static pitch is minus as shown in FIG. 4, the risk of the magnetic disk 13 being scratched is high if the minus value of the static pitch is large.

The structure of the head assembly of the magnetic disk apparatus in the embodiment of the present invention will now be described.

Figure 6:
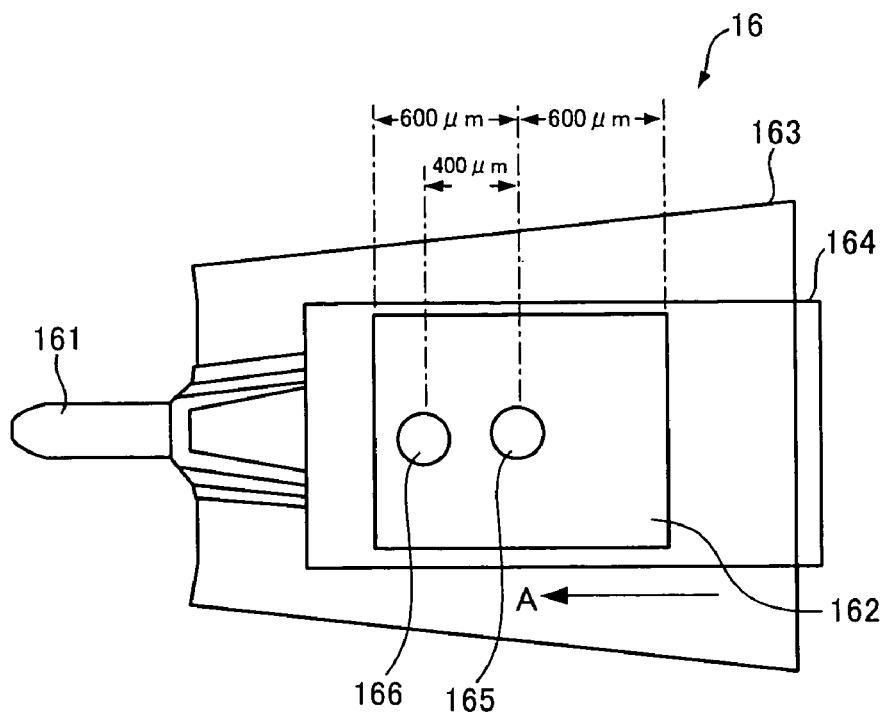
FIG. 6 is a see-through top view of a head assembly of a magnetic disk apparatus in an embodiment of the present invention seen from the floating surface side of a magnetic head.
Figure 7:
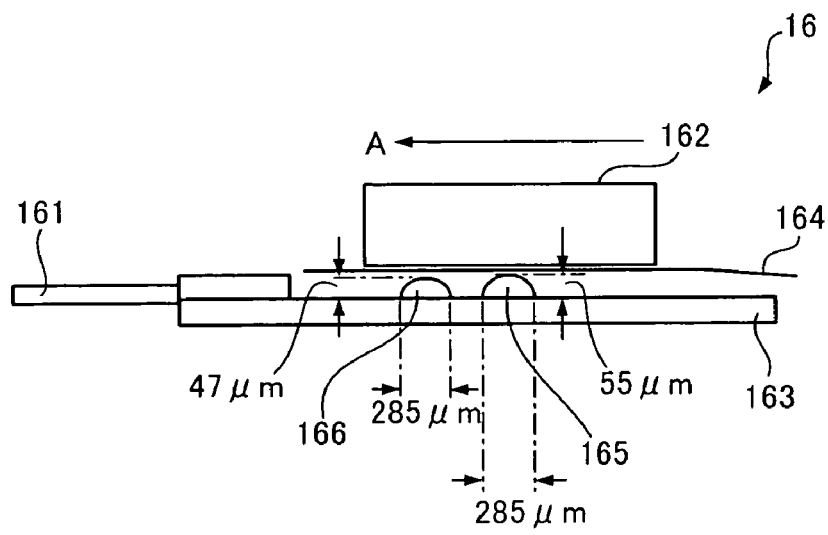
FIG. 7 is a side view of the head assembly shown in FIG. 6, with the floating surface of the magnetic head shown at the top.

FIG. 6 is a see-through top view of the head assembly of the magnetic disk apparatus in the embodiment of the present invention seen from the floating surface side of the magnetic head. FIG. 7 is a side view of the head assembly shown in FIG. 6, with the floating surface of the magnetic head shown at the top.

The head assembly shown in FIGS. 6 and 7 has a projection 161, a magnetic head 162 (including a slider), a suspension 163 and a gimbal 164. The projection 161, the magnetic head 162, the suspension 163 and the gimbal 164 respectively correspond to the projection 261, the magnetic head 262, the suspension 263 and the gimbal 264 of the conventional head assembly 26 described above with reference to FIGS. 2 and 3. The head assembly in this embodiment is the same as the conventional head assembly shown in FIGS. 2 and 3 except for a point of difference described below.

The head assembly 16 shown in FIGS. 6 and 7 differs from the conventional head assembly shown in FIGS. 2 and 3 in that an auxiliary dowel 166 is provided in addition to a dowel 165 corresponding to the dowel 265 provided on the suspension 263 constituting the conventional head assembly 26 shown in FIGS. 2 and 3. The dowel 165 is provided at such a position as to support the magnetic head 162 at a center of the same, as is that in the conventional head assembly. The size of the dowel 165 is also the same as that in the conventional head assembly. In contrast, the dowel 166 is provided in a forward position (on the air outflow side) in the direction of arrow A relative to the dowel 165. The distance between centers of the dowel 165 and the auxiliary dowel 166 is 400 µm, as shown in FIG. 6. The diameter of the auxiliary dowel 166 is 285 µm, equal to that of the dowel 165, as shown in FIG. 7, but the height of the auxiliary dowel 166 is 47 µm, lower than the height 55 µm of the dowel 165.

The static pitch of the magnetic head 162 in a state of being supported on both the dowel 165 and the auxiliary dowel 166 is about minus one degree.

Figure 8:
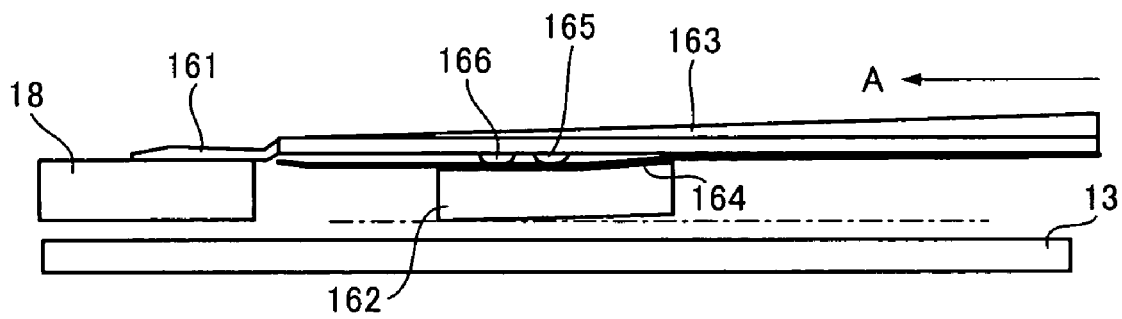
FIG. 8 is a diagram schematically showing the static pitch of the head assembly in the embodiment of the present invention shown in FIGS. 6 and 7.

FIG. 8 is a diagram schematically showing the static pitch of the head assembly in the embodiment of the present invention shown in FIGS. 6 and 7.

FIG. 8 shows the pitch on the plus side. Since the height of the auxiliary dowel 166 existing on the air outflow side (in the direction of arrow) is lower than that of the dowel 165, there is a possibility of the magnetic head tilting so that the static pitch is minus one degree at the maximum. In some case of the conventional magnetic head device (see FIGS. 2 and 3), the magnetic head tilts so that the static pitch has a minus value largely exceeding minus one degree. In such a case, the lifting force is considerably reduced. In the case of this embodiment, however, a sufficiently large lifting force can be obtained since the static pitch on the minus side is minus one degree at the maximum, thus effectively reducing the possibility of the magnetic head contacting the magnetic disk during the loading operation.

Description will next be made of the results of an experiment performed to examine the occurrence of scratches on the magnetic disk with respect to loading/unloading (L/UL).

A plurality of head assemblies are prepared by changing the position at which the auxiliary dowel 166 is provided (the distance between the dowel 165 and the auxiliary dowel 166 (400 µm in the example shown in FIGS. 6 and 7) and the height of the auxiliary dowel 166 (47 µm in the example shown in FIGS. 6 and 7) to change the static pitch. The rate of occurrence of scratches on the magnetic disk after performing loading/unloading 100,000 times (100 k times) by moving the magnetic head at a loading/unloading speed of 0.08 m/sec is examined. In the state of being supported on the ramp 18, the static pitch is maximized on the minus side, that is, the magnetic head is supported by both the dowel 165 and the auxiliary dowel 166 due to the structure of the gimbal 164. The static pitch in this state can be uniquely determined from the distance between the dowel 165 and the auxiliary dowel 166 and the height of the auxiliary dowel 166 (while the position and height of the dowel 165 are fixed).

Figure 9:
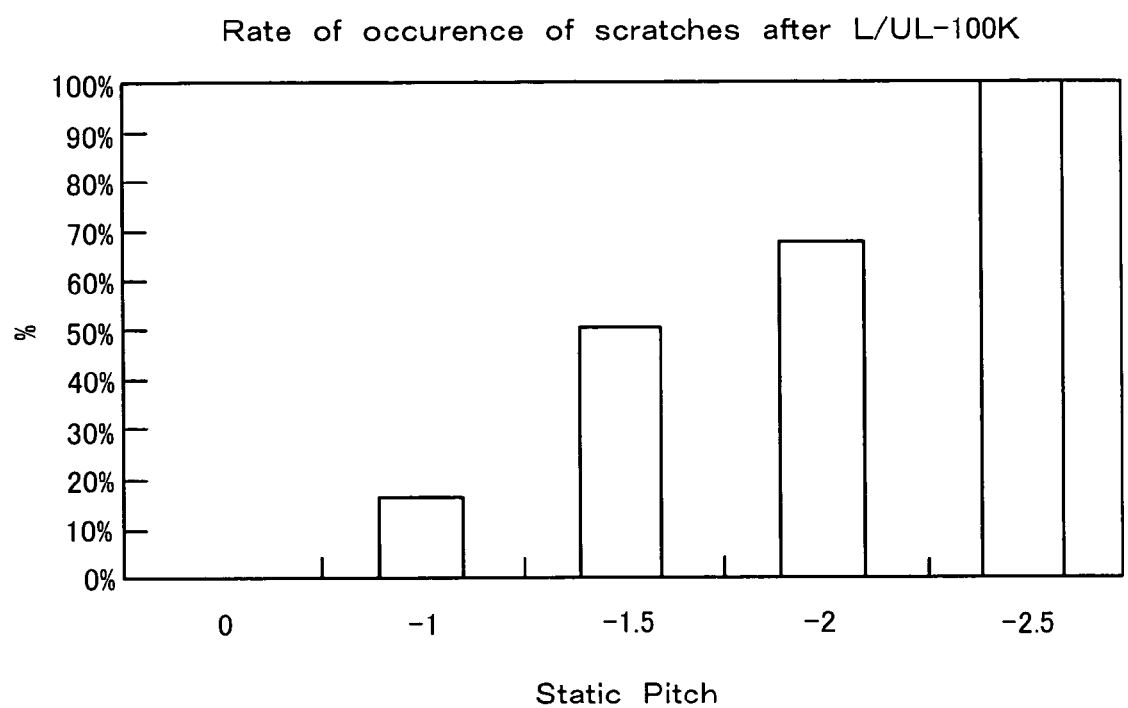
FIG. 9 is a diagram showing the relationship between the value of the static pitch and the rate of occurrence of scratches on the magnetic disk after performing L/UL (loading/unloading) 100 k times (100,000 times).

FIG. 9 shows the relationship between the value of the static pitch and the rate of occurrence of scratches on the magnetic disk after performing L/UL (loading/unloading) 100 k times (100,000) times.

It can be understood that when the static pitch is equal to or smaller than minus one degree (on the plus side from minus one degree) the scratch occurrence rate is lower than a tolerance limit.

While the assumption for the above description is that the magnetic disk apparatus has only one magnetic disk 13 and only one side of the magnetic disk 13 is accessed, the present invention is also applicable to a magnetic disk apparatus in which each of two sides of a magnetic disk is accessed, and to a magnetic disk apparatus in which plural magnetic disks are disposed coaxially with each other and rotated and each magnetic disk is accessed.

While the above description is made of magnetic disk apparatus, the present invention is applicable not only to magnetic disk apparatus but also to disk apparatus which access other types of storage mediums, e.g., optical disks and magneto-optic disks.

What is claimed is:

1. A disk apparatus in which a storage medium in the form of a disk is rotated and accessed, the disk apparatus comprising:
    a head which is brought close to the storage medium, and with which the storage medium is accessed;
    an arm which is rotated to move a tip end portion thereof in a radial direction of the storage medium;
    a suspension which is provided on the tip end portion of the arm, and which has a first projection; and
    a gimbal which is attached to the suspension, and through which the head is supported on the first projection at a center of the head, the head being fixed on the gimbal so as to be tiltable on the first projection,
    wherein the suspension has a second projection at a position adjacent to the first projection and superposed on the head as seen in a direction perpendicular the head.

2. The disk apparatus according to claim 1, wherein the second projection of the suspension is provided on the air outflow side relative to the first projection.

3. The disk apparatus according to claim 2, wherein the second projection is lower in height than the first projection.

4. The disk apparatus according to claim 2, wherein the second projection has a height such that the tilt of the head on the air inflow side in a state where the head is supported on both the first projection and the second projection is equal to or larger than minus one degree.

5. The disk apparatus according to claim 1, wherein the arm rotates to move the tip end portion of the arm beyond the outer circumference of the storage medium, the disk apparatus further comprising a supporting member which supports the arm in a state of having the tip end portion of the arm moved to a position off the storage medium.

* * * * *